United States Patent
Lee et al.

(10) Patent No.: US 11,328,516 B2
(45) Date of Patent: May 10, 2022

(54) APPARATUS AND METHOD FOR ASSOCIATING SENSOR DATA IN VEHICLE

(71) Applicants: HYUNDAI MOTOR COMPANY, Seoul (KR); KIA MOTORS CORPORATION, Seoul (KR)

(72) Inventors: Hoon Lee, Gunpo-si (KR); Hyung Sun Jang, Anyang-si (KR); Bo Young Yun, Hwaseong-si (KR); Seul Ki Han, Seoul (KR); Ji Eun Won, Hwaseong-si (KR); Uk Il Yang, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/005,127

(22) Filed: Jun. 11, 2018

(65) Prior Publication Data
US 2019/0138825 A1    May 9, 2019

(30) Foreign Application Priority Data
Nov. 7, 2017   (KR) .......................... 10-2017-0147439

(51) Int. Cl.
*G06K 9/00* (2006.01)
*B60W 40/04* (2006.01)
(Continued)

(52) U.S. Cl.
CPC ............. *G06V 20/58* (2022.01); *B60W 40/04* (2013.01); *B60W 40/072* (2013.01); *G06V 20/56* (2022.01); *G06V 20/584* (2022.01)

(58) Field of Classification Search
CPC G60K 9/00805; B60W 40/04; B60W 40/072; G06K 9/00825
(Continued)

(56) References Cited

U.S. PATENT DOCUMENTS 9,313,462 B2    4/2016  Einecke et al.
2002/0005778 A1*  1/2002  Breed ..................... G01S 7/481
                                                          340/435
(Continued)

FOREIGN PATENT DOCUMENTS

JP        2013-190421 A1    9/2013

OTHER PUBLICATIONS

Notice of Allowance issued in corresponding Korean Patent Application No. 10-2107-0147439 dated Jan. 24, 2022, with English translation.

*Primary Examiner* — Jack K Wang
(74) *Attorney, Agent, or Firm* — Morgan, Lewis & Bockius LLP

(57) ABSTRACT

The present disclosure provides an apparatus for associating sensor data in a vehicle. The apparatus includes a plurality of sensors configured to sense an external object and a processor configured to be electrically connected with the plurality of sensors. The processor is configured to obtain a sensor data set for a target located around the vehicle using the plurality of sensors, select at least a portion of sensor data included in the sensor data set based on at least one of target information, a curvature of a road where the vehicle or the target is traveling, or a type of a sensor configured to sense the target, and generate track data for the target by associating at least the portion of the sensor data.

15 Claims, 12 Drawing Sheets

(51) Int. Cl.
*B60W 40/072* (2012.01)
*G06V 20/58* (2022.01)
*G06V 20/56* (2022.01)

(58) Field of Classification Search
USPC .......................................................... 340/933
See application file for complete search history.

(56) References Cited

U.S. PATENT DOCUMENTS

| | | |
|---|---|---|
| 2003/0097230 A1 | 5/2003 | Garabedian |
| 2008/0046150 A1* | 2/2008 | Breed ................. B60R 21/0134 701/45 |
| 2009/0231180 A1 | 9/2009 | Shalley et al. |
| 2010/0253595 A1* | 10/2010 | Szczerba ............... G01S 13/931 345/7 |
| 2010/0292886 A1* | 11/2010 | Szczerba ............... G01S 13/723 701/31.4 |
| 2013/0335569 A1 | 12/2013 | Einecke et al. |
| 2014/0104078 A1* | 4/2014 | Urano ................. G06K 9/00825 340/933 |
| 2014/0148988 A1* | 5/2014 | Lathrop ................ B60W 50/14 701/23 |
| 2015/0360697 A1* | 12/2015 | Baek ..................... B60W 40/09 701/23 |
| 2016/0001781 A1* | 1/2016 | Fung ...................... B60K 28/02 701/36 |
| 2019/0092333 A1* | 3/2019 | Ishioka ................... B60Q 1/346 |
| 2019/0171218 A1* | 6/2019 | Hammond ............. G05D 1/024 |
| 2019/0315373 A1* | 10/2019 | Kondo .................... G08G 1/16 |
| 2020/0262349 A1* | 8/2020 | Oniwa ................. G08G 1/0962 |
| 2020/0385014 A1* | 12/2020 | Hanniel ............. B60W 60/001 |

* cited by examiner

APPARATUS AND METHOD FOR ASSOCIATING SENSOR DATA IN VEHICLE

CROSS-REFERENCE TO RELATED APPLICATION

The present application claims priority to and the benefit of Korean Patent Application No. 10-2017-0147439, filed on Nov. 7, 2017, which is incorporated herein in its entirety by reference.

FIELD

The present disclosure relates to an apparatus and method for associating data obtained by a plurality of sensors.

BACKGROUND

The statements in this section merely provide background information related to the present disclosure and may not constitute prior art.

With the development of the auto industry, a system capable of tracking surrounding vehicles and obtaining a variety of information associated with the surrounding vehicles has been developed to provide convenience to drivers. For example, a vehicle may obtain information about surrounding vehicles located in all directions using various sensors such as a front radar, a corner radar, a front view camera, a side view camera, a rear view camera, a vision, and a light detection and ranging (LIDAR). The vehicle may generating sensor fusion data by associating sensor data obtained by each of the various sensors. As a result, the accuracy of data obtained by each of the various sensors may be enhanced. The vehicle may associate sensor fusion data of a previous frame with sensor fusion data of a current frame.

It may be difficult to associate data of a previous frame with data of a current frame because of traveling environments (i.e., movement of the vehicle, movement of a target, a sensing range of each of a plurality of sensors, and etc.). In this case, attributes information (e.g., information indicating a type (a vehicle, a pedestrian, or the like) of a target) and an identifier (ID) (e.g., a unique identification value assigned to the target) of sensor fusion data of a previous frame for the same target may differ from attributes information and an ID of sensor fusion data of a current frame for the same target. When the vehicle fails in data association, operations of various systems using sensors supported by the vehicle may also fail.

SUMMARY

An aspect of the present disclosure provides an apparatus and method for associating sensor data to associate data obtained by a sensor in a robust manner in overall consideration of a vehicle, a surrounding vehicle, a traveling environment, and the like.

In one aspect of the present disclosure, an apparatus for associating sensor data in a vehicle may include: a plurality of sensors configured to sense an external object and a processor configured to be electrically connected with the plurality of sensors. The processor may be configured to obtain a sensor data set for a target located around the vehicle using the plurality of sensors, select at least a portion of sensor data included in the sensor data set based on at least target information, a curvature of a road where the vehicle or the target is traveling, or a type of a sensor configured to sense the target, and generate track data for the target by associating at least the portion of the sensor data.

In some forms of the present disclosure, the plurality of sensors may include a radar and a camera.

In some forms of the present disclosure, the plurality of sensors may include a front radar, a front view camera, and a side view camera.

In some forms of the present disclosure, the sensor data set may include sensor data obtained by each sensor of the plurality of sensors.

In some forms of the present disclosure, the processor may be configured to set a region for determining validity of the sensor data set based on the at least one of the target information, the curvature of the road where the vehicle is traveling, or the type of the sensor configured to sense the target and to select sensor data corresponding to the region among the sensor data included in the sensor data set.

In some forms of the present disclosure, the target information may include at least one of a distance between the vehicle and the target, a difference between a speed of the vehicle and a speed of the target, a motion direction of the target, or a type of the target.

In some forms of the present disclosure, the processor may be configured to set a region for determining validity of the sensor data set based on the distance between the vehicle and the target and select sensor data corresponding to the region among the sensor data included in the sensor data set.

In some forms of the present disclosure, the processor may be configured to increase the region when the distance between the vehicle and the target becomes farther than a predetermined distance and decrease the region when the distance between the vehicle and the target becomes closer than the predetermined distance.

In some forms of the present disclosure, the processor may be configured to set a region for determining validity of the sensor data set based on a difference between the speed of the vehicle and the speed of the target and select sensor data corresponding to the region among the sensor data included in the sensor data set.

In some forms of the present disclosure, the processor may be configured to increase the region when the difference between the speed of the vehicle and the speed of the target becomes greater than a predetermined value and decrease the region when the difference between the speed of the vehicle and the speed of the target becomes less than the predetermined value.

In some forms of the present disclosure, the processor may be configured to set a region for determining validity of the sensor data set based on a curvature of the road and select sensor data corresponding to the region among the sensor data included in the sensor data set.

In some forms of the present disclosure, the processor may be configured to increase the region when the curvature of the roadway becomes greater than a predetermined range and decrease the region when the curvature of the roadway becomes less than the predetermined range.

In some forms of the present disclosure, the processor may be configured to set a region for determining validity of the sensor data set based on a motion direction of the target and select sensor data corresponding to the region among the sensor data included in the sensor data set.

In some forms of the present disclosure, the processor may be configured to increase a length of the region in the motion direction of the target.

In some forms of the present disclosure, the processor may be configured to set a region for determining validity of the sensor data set based on the type of the sensor and select sensor data corresponding to the region among the sensor data included in the sensor data set.

In some forms of the present disclosure, the processor may be configured to set a region for determining validity of the sensor data set based on the type of the target and select sensor data corresponding to the region among the sensor data included in the sensor data set.

In another aspect of the present disclosure, a method for associating sensor data in a vehicle may include: obtaining a sensor data set for a target located around the vehicle using a plurality of sensors of the vehicle, selecting at least a portion of sensor data included in the sensor data set based on at least one of target information, a curvature of a road where the vehicle or the target is traveling, or a type of a sensor configured to sense the target, and generating track data for the target by associating at least a portion of the sensor data.

In some forms of the present disclosure, the sensor data set may include sensor data obtained by each sensor of the plurality of sensors.

In some forms of the present disclosure, selecting the at least the portion of the sensor data may include setting a region for determining validity of the sensor data set based on the at least portion of the target information, the curvature of the roadway where the vehicle is traveling, or the type of the sensor configured to sense the target and selecting sensor data corresponding to the region among the sensor data included in the sensor data set.

In some forms of the present disclosure, the target information may include at least one of a distance between the vehicle and the target, a difference between a speed of the vehicle and a speed of the target, a motion direction of the target, or a type of the target.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
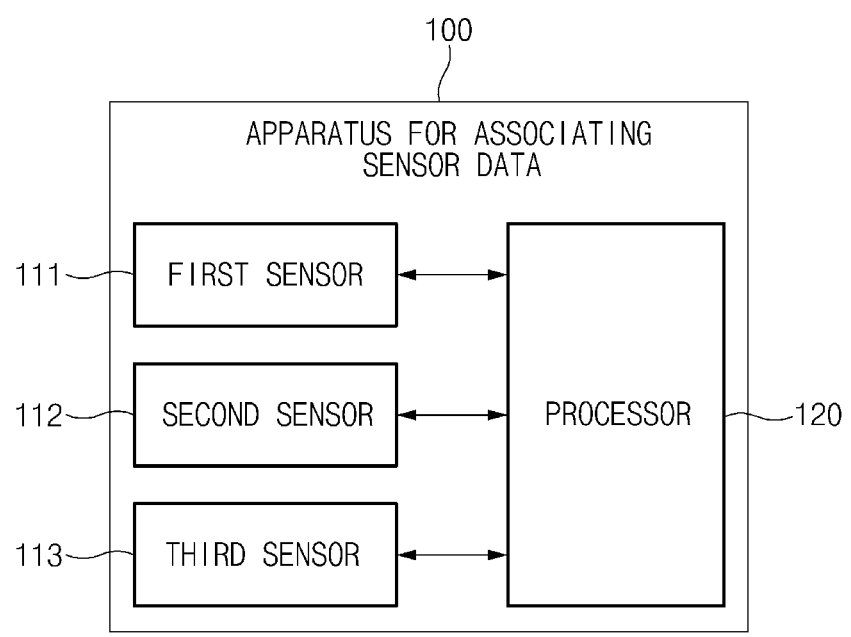
FIG. 1 is a block diagram illustrating a configuration of an apparatus for associating sensor data.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, forms of the present disclosure will be described in detail with reference to the accompanying drawings. In adding reference denotations to elements of each drawing, although the same elements are displayed on a different drawing, it should be noted that the same elements have the same denotations. In addition, in describing a form of the present disclosure, if it is determined that a detailed description of related well-known configurations or functions blurs the gist of a form of the present disclosure, it will be omitted.

In describing elements of forms of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus for associating sensor data in some forms of the present disclosure.

Referring to FIG. 1, an apparatus 100 for associating sensor data in a vehicle (hereinafter referred to as "apparatus 100" for convenience of description) may include a plurality of sensors 111 to 113 and a processor 120. The apparatus 100 of FIG. 1 may be loaded into the vehicle.

Each of the plurality of sensors 111 to 113 may be configured to sense an external object. Each of the plurality of sensors 111 to 113 may be configured to obtain information about the external object. For example, each of the plurality of objects 111 to 113 may obtain information about a location of an external object, a speed of the external object, a movement direction of the external object, and/or a type (e.g., a vehicle, a pedestrian, a bicycle, a motorcycle, or the like) of the external object. The plurality of sensors 111 to 113 may include, for example, a radar and a camera. For example, the first sensor 111 may be a front radar, the second sensor 112 may be a front view camera, and the third sensor 113 may be a side view camera. In FIG. 1, an exemplary form is described as the apparatus 100 includes the three sensors 111 to 113. However, forms are not limited thereto. For example, the apparatus 100 may include two or more sensors or may include different types of sensors such as a laser scanner and/or a corner radar.

The processor 120 may be electrically connected with the plurality of sensors 111 to 113. The processor 120 may control the plurality of sensors 111 to 113 and may perform a variety of data processing and various arithmetic operations.

In some forms of the present disclosure, the processor 120 may obtain a sensor data set for a target located around the vehicle using the plurality of sensors 111 to 113. The processor 120 may detect the target through each of the plurality of sensors 111 to 113. The sensor data set may include sensor data obtained by each of the plurality of sensors 111 to 113. For example, the processor 120 may obtain first data using the first sensor 111, may obtain second data using the second sensor 112, and may obtain third data using the third sensor 113. The processor 120 may obtain a set of sensor data including the first data, the second data, and the third data.

In some forms of the present disclosure, the processor 120 may select at least a portion of a sensor data set based on at least a portion of information about a target, a curvature of a roadway where the vehicle or the target is traveling, or a type of a sensor which senses the target. The information about the target may include, for example, information about at least a portion of a distance between the vehicle and the target, a difference between a speed of the vehicle and a speed of the target, a motion direction of the target, or a type of the target. The processor 120 may set a region for determining validity of the sensor data set based on at least a portion of the information about the target, the curvature of the roadway where the vehicle is traveling, or the type of the sensor which senses the target. The region may be a region for gating the sensor data set. The processor 120 may select sensor data corresponding to a set region among sensor data included in the sensor data set. The processor 120 may perform sensor fusion using the selected sensor data. A description will be given of a detailed operation of setting the region for determining the validity with reference to FIGS. 5 to 10.

In some forms of the present disclosure, the processor 120 may generate track data for the target by associating at least a portion of the selected sensor data. The track data may be data for the target, obtained through sensor fusion. The processor 120 may store track data of a previous frame. The processor 120 may obtain prediction data by predicting motion of the target using the track data of the previous frame. The processor 120 may associate the selected sensor data with data predicted from the track data of the previous frame. The processor 120 may associate data using, for example, coordinates included in the track data of the previous frame and coordinates of the selected sensor data. The processor 120 may generate track data of a current frame for the target through the association.

Figure 2:
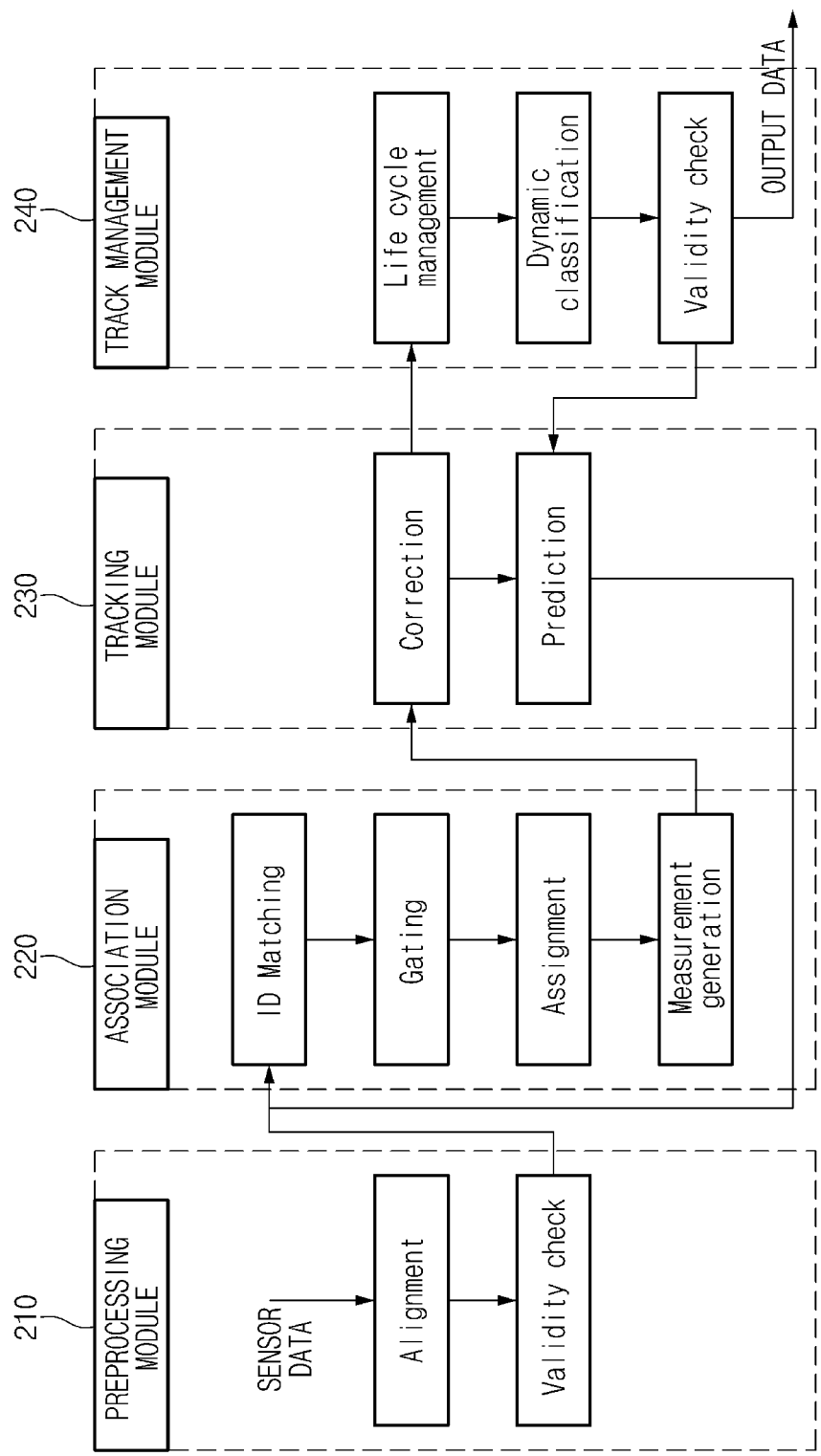
FIG. 2 is a block diagram illustrating a configuration of a program module included in an apparatus for associating sensor data.

FIG. 2 is a block diagram illustrating a configuration of a program module included in an apparatus for associating sensor data in some forms of the present disclosure.

Referring to FIG. 2, the apparatus in some forms of the present disclosure may include a program module. The program module may be for sensor fusion, may obtain data for a target from a plurality of sensors, and may generate sensor fusion track data for the target. The program module may include a preprocessing module 210, an association module 220, a tracking module 230, and a track management module 240.

The preprocessing module 210 may receive a signal from the plurality of sensors. The preprocessing module 210 may perform temporal/spatial synchronization of the received signal. The preprocessing module 210 may classify a detected target as a movement object or a stop object. The preprocessing module 210 may perform verification (e.g., fault detection & isolation (FDI)—track continuity, track movement history, measurement comparison, or the like) of validation of each of the plurality of sensors.

The association module 220 may determine association between sensor fusion track data of a previous frame and sensor data of a current frame. The association module 220 may change an association map as a result of the determination. The association module 220 may generate a new association map (e.g., a track candidate) using sensor data of a current frame which is not associated. The association module 220 may verify the association between the sensor fusion track data of the previous frame and the sensor data of the current frame.

The tracking module 230 may update location information, speed information, and estimation error information of the sensor fusion track data. The tracking module 230 may update estimation error covariance information.

The track management module 240 may perform management (e.g., initialization, confirmation, or termination) of a life cycle of sensor fusion track data. The track management module 240 may classify the sensor fusion track data as data for a movement object or data for a stop object. The track management module 240 may perform verification (FDI-track continuity, track movement history, spatial similarity, temporal similarity, or the like) of validity of the sensor fusion track data.

Figure 3:
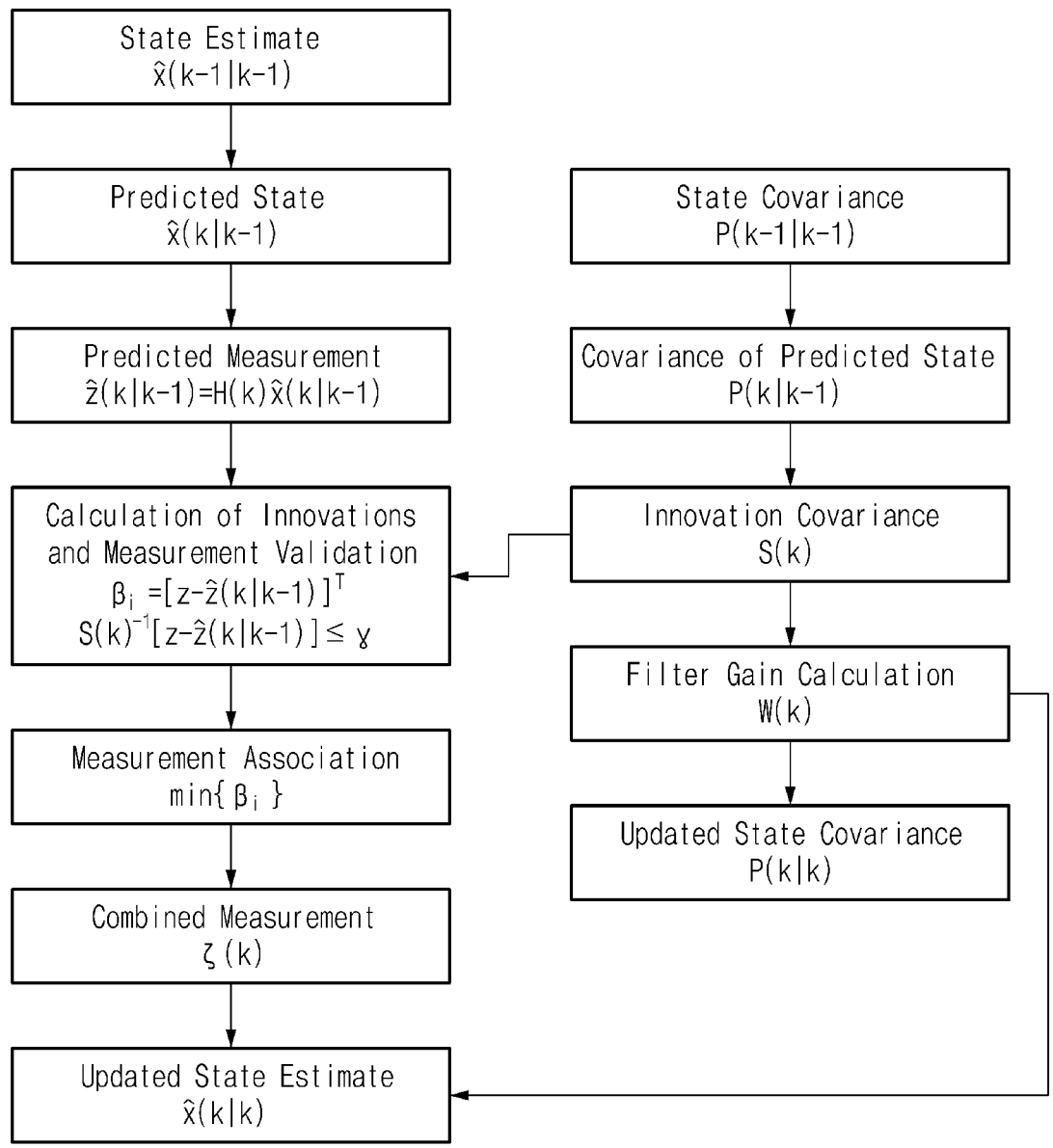
FIG. 3 is a flowchart illustrating an algorithm used in an apparatus for associating sensor data.

FIG. 3 is a flowchart illustrating an algorithm used in an apparatus for associating sensor data according to a form of the present disclosure.

Referring to FIG. 3, the apparatus in some forms of the present disclosure may use a nearest neighbor (NN) data association technique. The NN data association technique may be easily implemented and may provide an accurate result when a motion and measurement model of a system is accurate. Herein, while the NN data association technique is executed, inadequate data association may occur and an inadequate measurement value may be used to generate sensor fusion track data due to the inadequate data association. This may result in deterioration in performance of the technique. The apparatus in some forms of the present disclosure may provide a function for enhancing performance of operations (e.g., calculation of innovations and measurement validation, measurement association, and combined measurement) associated with data association.

Figure 4:
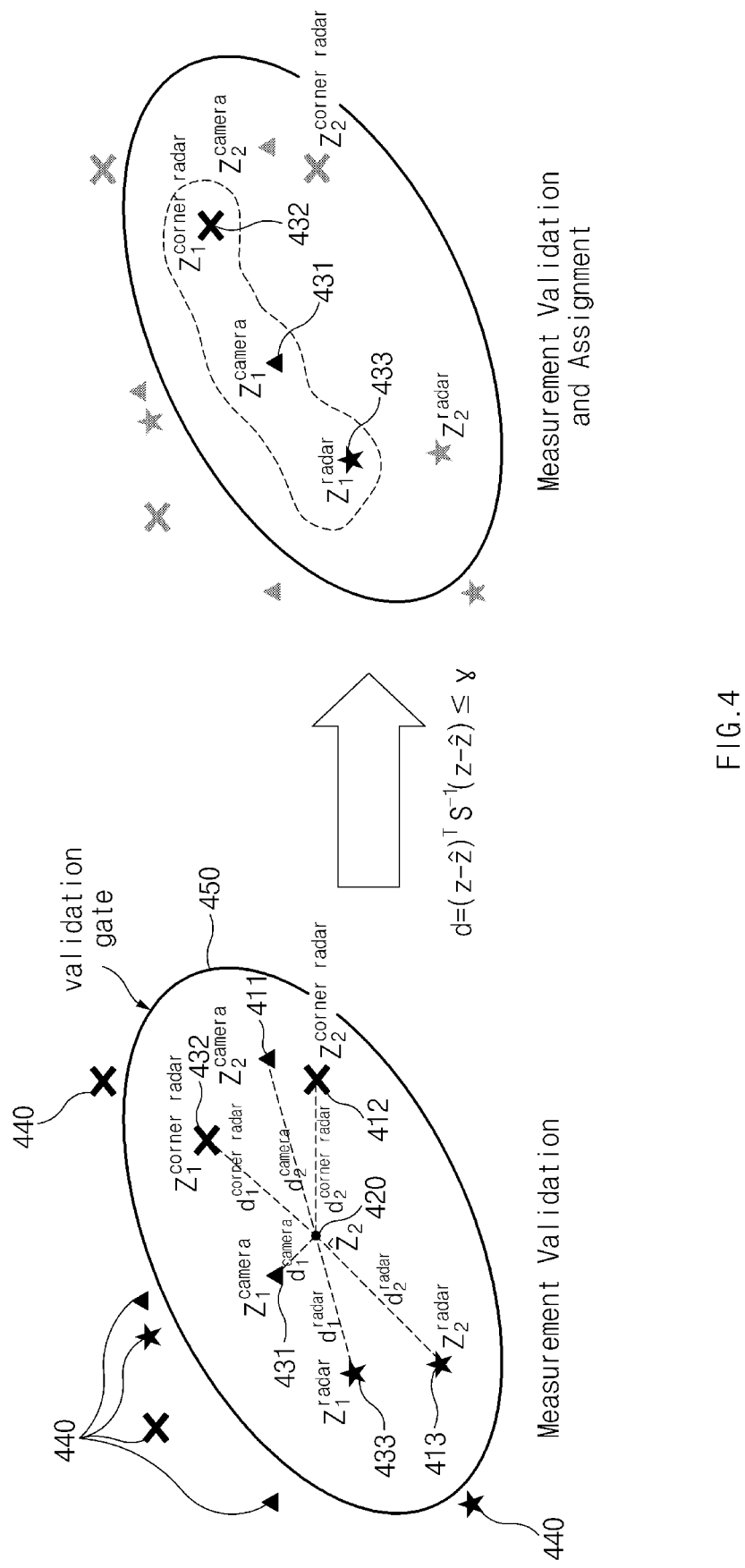
FIG. 4 is a drawing illustrating an exemplary operation of an apparatus for associating sensor data.

FIG. 4 is a drawing illustrating an exemplary operation of an apparatus for associating sensor data in some forms of the present disclosure.

Referring to FIG. 4, the apparatus in some forms of the present disclosure may determine association between sensor fusion track data at a previous time and newly measured sensor data. For example, the apparatus may generate sensor fusion track data of a first frame (a previous frame) based on sensor data ($z_2$) 411 to 413 measured at the first frame by a camera, a corner radar, and a radar. The apparatus may predict motion of a target based on the sensor fusion track data of the first frame and may predict sensor fusion track data ($\hat{Z}_2$) 420 to be obtained at a second frame (a current frame). The apparatus may obtain sensor data ($z_1$) 431 to 433 measured at the second frame by a camera, a corner radar, and a radar. The apparatus may select the sensor data 411 to 413 and 431 to 433 having coordinates in a gate 450 among data measured by a plurality of sensors. An exemplary equation for selecting data in the gate 450 may be Equation 1 below.

$$d = (z - \hat{z})^T S^{-1}(z - \hat{z}) \leq \gamma \quad \text{[Equation 1]}$$

$$\frac{(\dot{X}_{Radar} - \dot{X}_{Camera})^2}{(\sigma^2_{\dot{X},Radar} + \sigma^2_{\dot{X},Camera})} + \frac{(\dot{Y}_{Radar} - \dot{Y}_{Camera})^2}{(\sigma^2_{\dot{Y},Radar} + \sigma^2_{\dot{Y},Camera})} < C$$

$$\frac{(X_{Radar} - X_{Camera})^2}{(\sigma^2_{X,Radar} + \sigma^2_{X,Camera})} + \frac{(Y_{Radar} - Y_{Camera})^2}{(\sigma^2_{Y,Radar} + \sigma^2_{Y,Camera})} < C$$

The first formula above may be the Mahalanobis distance formula. z may denote measured sensor data, $\hat{Z}$ may denote predicted sensor fusion track data, d may denote a distance between coordinates of the measured sensor data and coordinates of the predicted sensor fusion track data, S may denote a covariance matrix, and Y may denote a gate threshold value. The apparatus may select sensor data which meets the first formula as valid sensor data. The second formula and the third formula may be derived from the first formula. A gate may be formed with an oval by Equation 1, and the gate threshold value may be changed depending on a situation which will be described with reference to FIGS. 5 to 10.

The apparatus may compare a distance between coordinates of the predicted sensor fusion track data 420 and coordinates of the sensor data 411 measured at the first frame by the camera with a distance between the coordinates of the predicted sensor fusion track data 420 and coordinates of the sensor data 431 measured at the second frame by the camera. The apparatus may select the sensor data 431 having coordinates which are relatively near to the coordinates of the predicted sensor fusion track data 420. The apparatus may select the sensor data 432 and the sensor data 433 in a similar manner. The apparatus may generate sensor fusion track data of the second frame using the selected sensor data 431 to 433.

Figure 5:
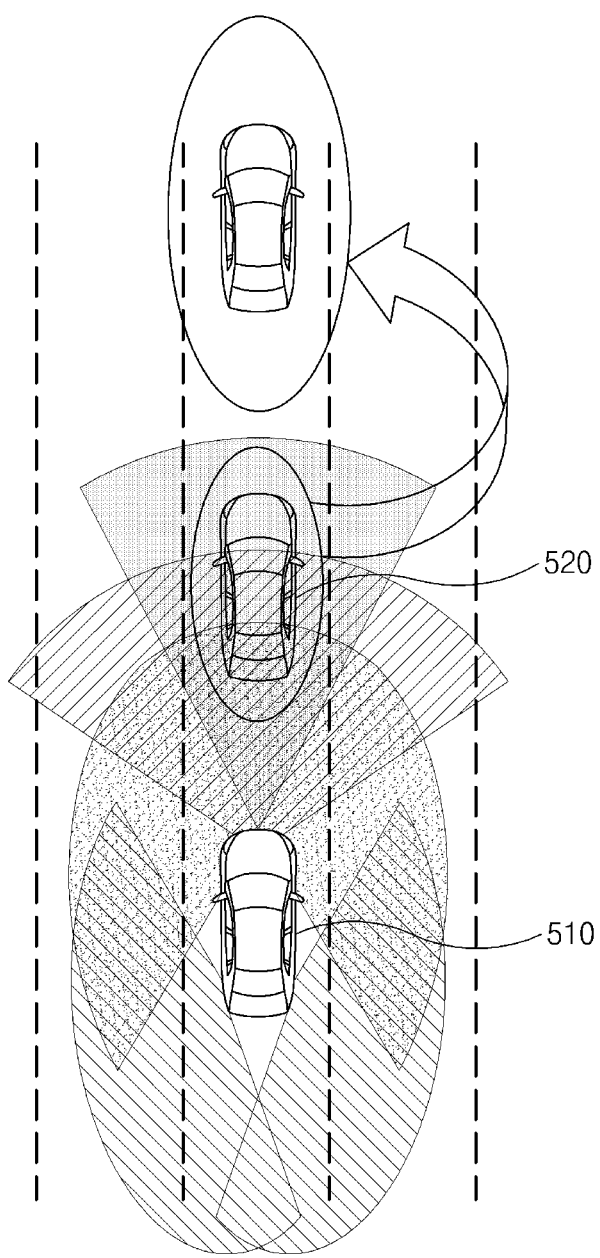
FIG. 5 is a drawing illustrating an exemplary operation of an apparatus for associating sensor data.

FIG. 5 is a drawing illustrating an exemplary operation of an apparatus for associating sensor data in some forms of the present disclosure.

A vehicle 510 shown in FIG. 5 may include an apparatus 100 of FIG. 1. In a description of FIG. 5, an operation described as being performed by the vehicle 510 may be understood as being controlled by a processor 120 of the apparatus 100.

In some forms of the present disclosure, a vehicle may set a region for determining validity of a sensor data set based on a distance between the vehicle and a target and may select sensor data corresponding to the set region among sensor data included in the sensor data set. For example, the vehicle may increase an area of the region when the distance between the vehicle and the target becomes long. The vehicle may decrease the area of the region when the distance between the vehicle and the target becomes short.

Referring to FIG. 5, the vehicle 510 may detect a vehicle around the vehicle 510 using its sensor. The vehicle 510 may detect, for example, a target vehicle 520 located in front of the vehicle 510. When the target vehicle 520 accelerates such that a distance between the target vehicle 520 and the vehicle 510 becomes long, a measurement value for the target vehicle 520 may increase in uncertainty. Thus, when the distance between the vehicle 510 and the target vehicle 520 becomes long, the vehicle 510 may increase a size of a gate.

Figure 6:
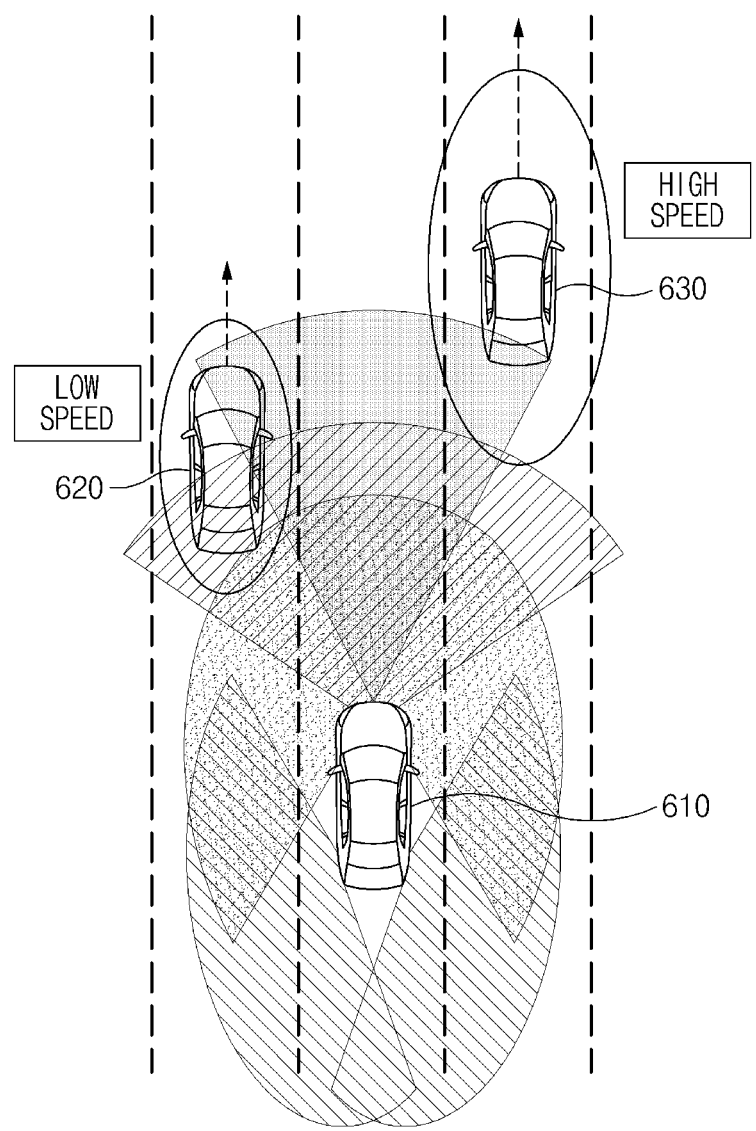
FIG. 6 is a drawing illustrating an exemplary operation of an apparatus for associating sensor data.

FIG. 6 is a drawing illustrating an exemplary operation of an apparatus for associating sensor data in some forms of the present disclosure.

A vehicle 610 shown in FIG. 6 may include an apparatus 100 of FIG. 1. In a description of FIG. 6, an operation described as being performed by the vehicle 610 may be understood as being controlled by a processor 120 of the apparatus 100.

In some forms of the present disclosure, a vehicle may set a region for determining validity of a sensor data set based on a difference between a speed of the vehicle and a speed of a target and may select sensor data corresponding to the set region among sensor data included in the sensor data set. For example, the vehicle may increase an area of the region when a difference between a speed of the vehicle and a speed of the target becomes large. The vehicle may decrease the area of the region when the difference between the speed of the vehicle and the speed of the target becomes small.

Referring to FIG. 6, the vehicle 610 may detect a vehicle around the vehicle 610 using its sensor. The vehicle 610 may detect, for example, a first target vehicle 620 located in the left front of the vehicle 610 and a second target vehicle 630 located in the right front of the vehicle 610. The vehicle 610 and the first target vehicle 620 may be traveling at a low speed, and the second target vehicle 630 may be traveling at a high speed. In this case, a relative speed of the vehicle 610 to the second target vehicle 630 may be faster than a relative speed of the vehicle 610 to the first target vehicle 620. As the relative speed is faster, a measurement value may be higher in uncertainty. Thus, the vehicle 610 may set a size of a gate for the second target vehicle 630 to be larger than a gate of a gate for the first target vehicle 620.

Figure 7:
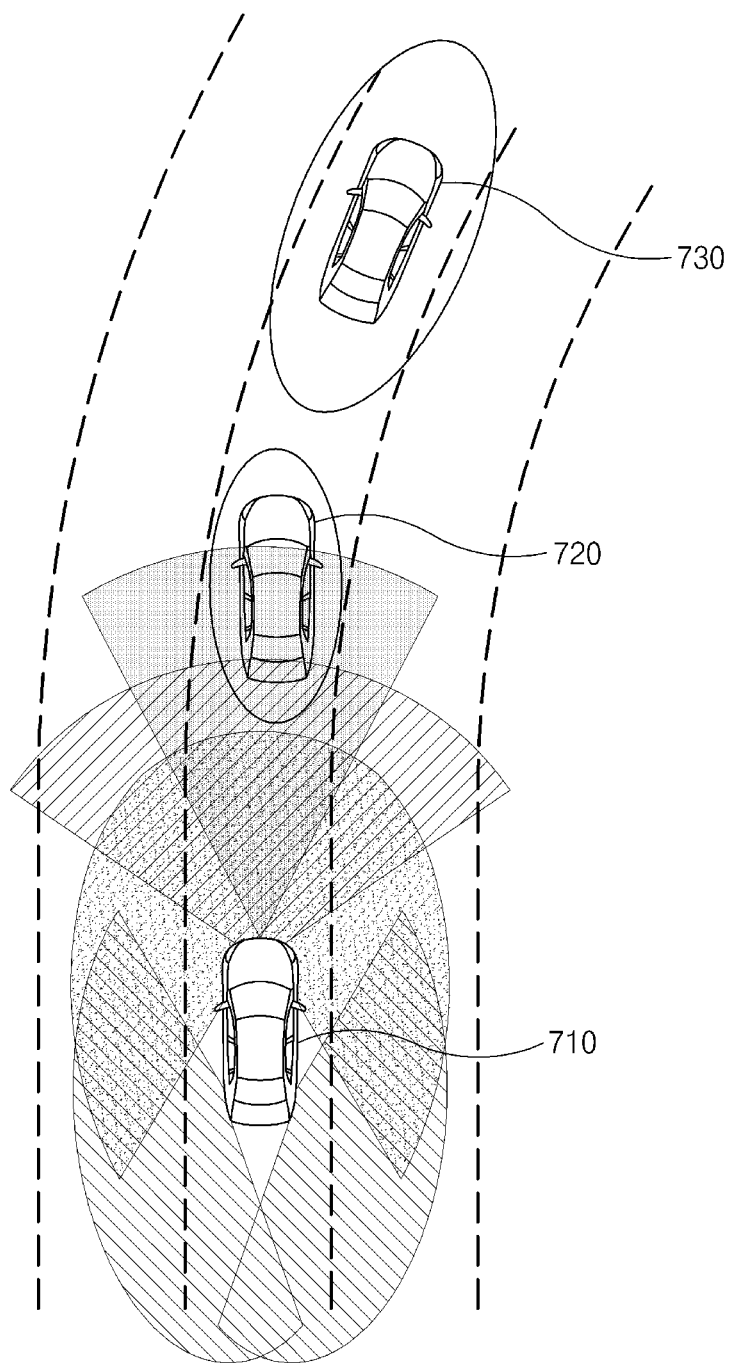
FIG. 7 is a drawing illustrating an exemplary operation of an apparatus for associating sensor data.

FIG. 7 is a drawing illustrating an exemplary operation of an apparatus for associating sensor data in some forms of the present disclosure.

A vehicle 710 shown in FIG. 7 may include an apparatus 100 of FIG. 1. In a description of FIG. 7, an operation described as being performed by the vehicle 710 may be understood as being controlled by a processor 120 of the apparatus 100.

In some forms of the present disclosure, a vehicle may set a region for determining validity of a sensor data set based on a curvature of a roadway and may select sensor data corresponding to the set region among sensor data included in the sensor data set. For example, the vehicle may increase an area of the region when the curvature of the roadway becomes large. The vehicle may decrease the area of the region when the curvature of the roadway becomes small.

Referring to FIG. 7, the vehicle 710 may detect a vehicle around the vehicle 710 using its sensor. The vehicle 710 may detect, for example, a first target vehicle 720 located in front of the vehicle 710 and a second target vehicle 730 located ahead of the first target vehicle 720. The vehicle 710 may obtain map information and may obtain roadway curvature information of a point where the first target vehicle 710 is located and roadway curvature information of a point where the second target vehicle 730 is located, using the map information. A curvature of the point where the second target vehicle 730 is located may be larger in magnitude than a curvature of the point where the first target vehicle 720 is located. As a curvature of a point where a target is located becomes larger, measurement value may higher in uncertainty. Thus, the vehicle 710 may set a size of a gate for the second target vehicle 730 to be larger than a size of a gate for the first target vehicle 720.

Figure 8:
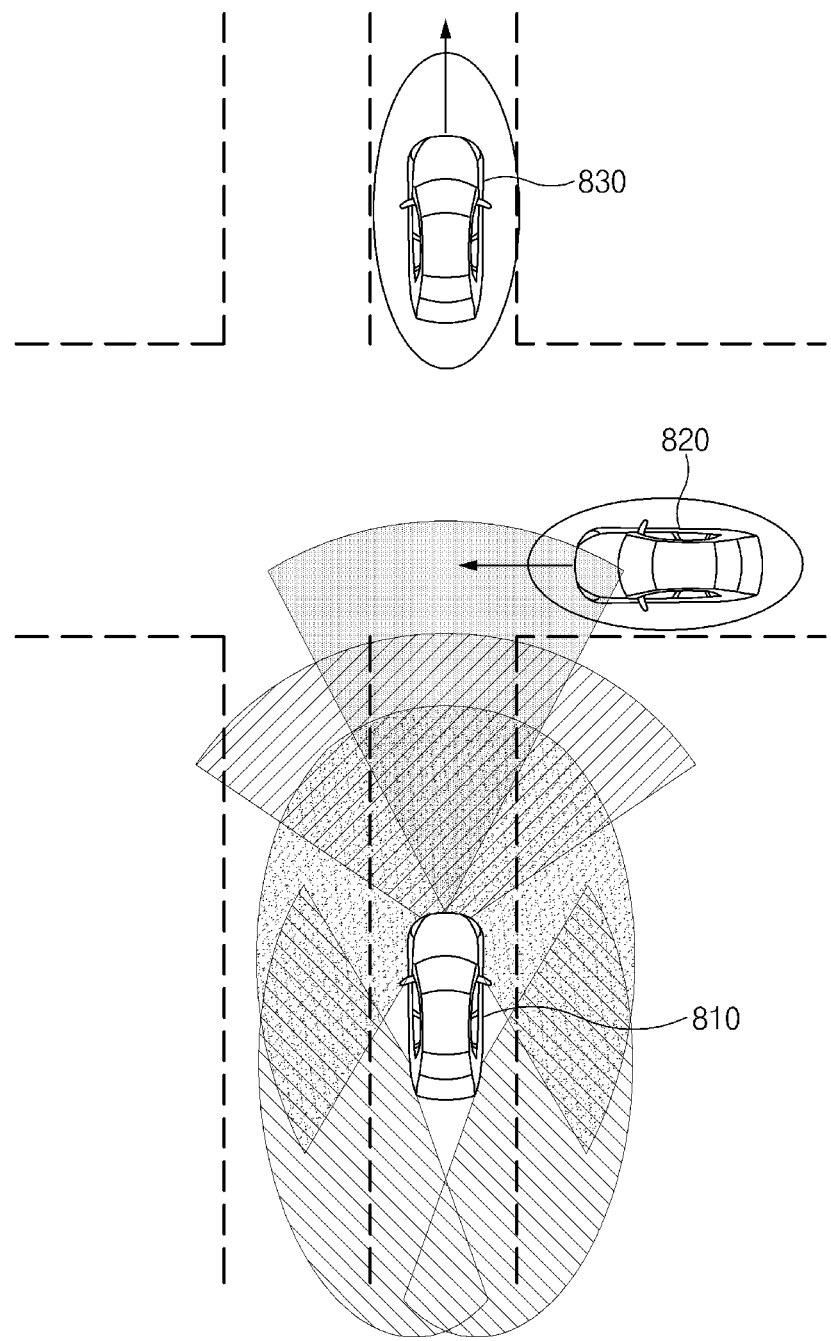
FIG. 8 is a drawing illustrating an exemplary operation of an apparatus for associating sensor data.

FIG. 8 is a drawing illustrating an exemplary operation of an apparatus for associating sensor data in some forms of the present disclosure.

A vehicle 810 shown in FIG. 8 may include an apparatus 100 of FIG. 1. In a description of FIG. 8, an operation described as being performed by the vehicle 810 may be understood as being controlled by a processor 120 of the apparatus 100.

In some forms of the present disclosure, a vehicle may set a region for determining validity of a sensor data set based on a motion direction of a target and may select sensor data corresponding to the set region among sensor data included in the sensor data set. For example, the vehicle may increase a length of the region.

Referring to FIG. 8, the vehicle 810 may detect a vehicle around the vehicle 810 using its sensor. The vehicle 810 may detect a first target vehicle 820 which is traveling in the left direction of the vehicle 810 and a second target vehicle 830 which is traveling toward the front of the vehicle 810. The vehicle 810 may obtain information about a motion direction of each of the first target vehicle 820 and the second target vehicle 830. When a target is moved, a measurement value for a motion direction may become higher in uncertainty. For example, when the target is moved in an x-axis direction, a measurement value for an x-axis coordinate may become higher in uncertainty. Thus, the vehicle 810 may set a gate for the first target vehicle 820 to be long in a horizontal direction and may set a gate for the second target vehicle 830 to be long in a vertical direction.

Figure 9:
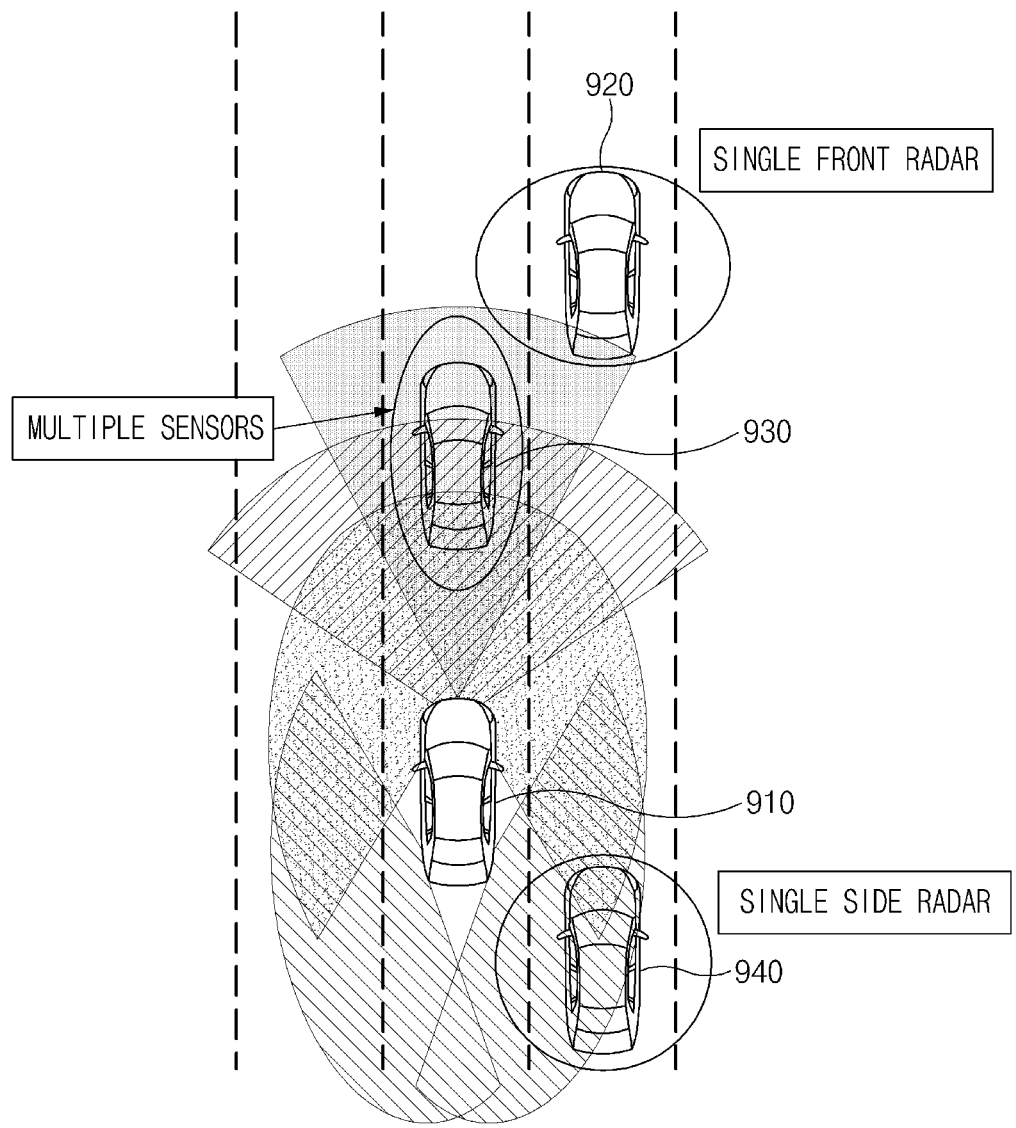
FIG. 9 is a drawing illustrating an exemplary operation of an apparatus for associating sensor data.

FIG. 9 is a drawing illustrating an exemplary operation of an apparatus for associating sensor data in some forms of the present disclosure.

A vehicle 910 shown in FIG. 9 may include an apparatus 100 of FIG. 1. In a description of FIG. 9, an operation described as being performed by the vehicle 910 may be understood as being controlled by a processor 120 of the apparatus 100.

In some forms of the present disclosure, a vehicle may set a region for determining validity of a sensor data set based on a type of a sensor and may select sensor data corresponding to the set region among sensor data included in the sensor data set.

Referring to FIG. 9, the vehicle 910 may detect a vehicle around the vehicle 910 using its sensor. The vehicle 910 may detect, for example, a first target vehicle 920, a second target vehicle 930, and a third target vehicle 940. The vehicle 910 may detect the first target vehicle 920 using only a front radar. Accuracy of a longitudinal location of the front radar may be high, but accuracy of a lateral location of the front radar may be low. Thus, the vehicle 910 may set a gate which is long in a left and right direction with respect to the first target vehicle 920 in consideration of a characteristic of the front radar which is a sensor which senses the first target vehicle 920. The vehicle 910 may detect the second target vehicle 930 using a front radar and a front view camera. When a target is detected using two sensors, accuracy of measurement may be enhanced. Thus, the vehicle 910 may set a gate for the second target vehicle 930 to be small in size. The vehicle 910 may detect the third target vehicle 940 using a side radar. Accuracy of the side radar may be similar in longitudinal and lateral directions. Thus, the vehicle 910 may set a circular gate for the third target vehicle 940 in consideration of a characteristic of the side radar.

Figure 10:
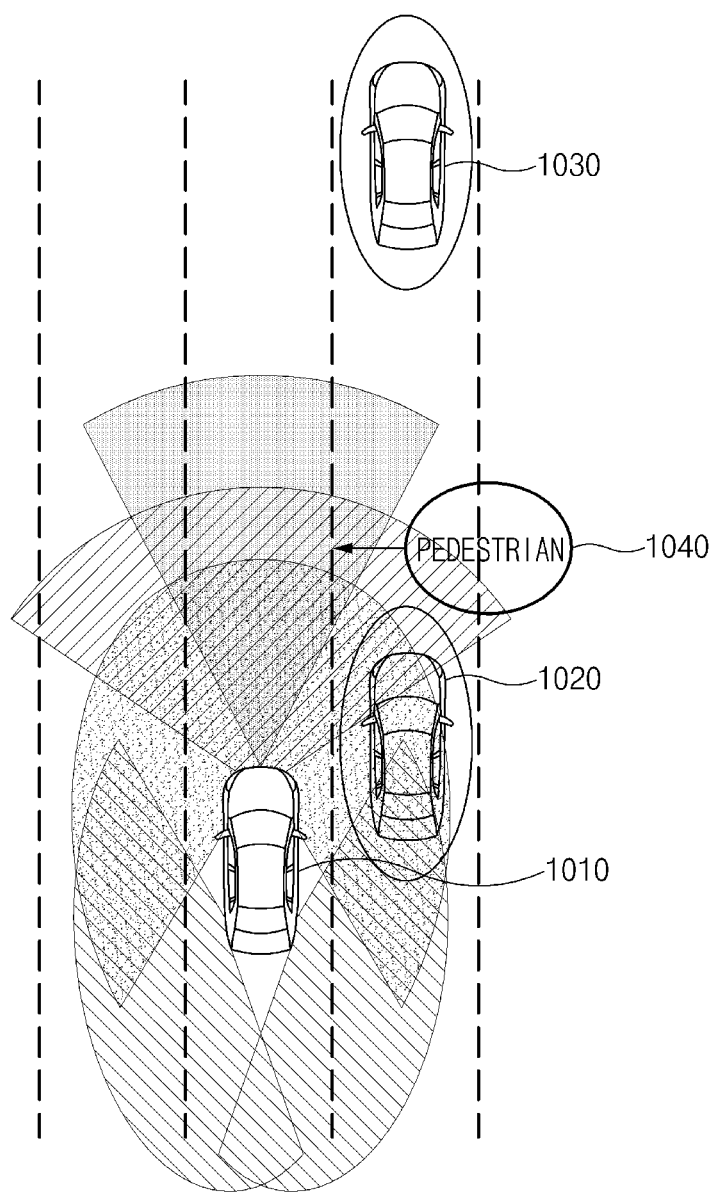
FIG. 10 is a drawing illustrating an exemplary operation of an apparatus for associating sensor data.

FIG. 10 is a drawing illustrating an exemplary operation of an apparatus for associating sensor data in some forms of the present disclosure.

A vehicle 1010 shown in FIG. 10 may include an apparatus 100 of FIG. 1. In a description of FIG. 10, an operation described as being performed by the vehicle 1010 may be understood as being controlled by a processor 120 of the apparatus 100.

In some forms of the present disclosure, a vehicle may set a region for determining validity of a sensor data set based on a type of a target and may select sensor data corresponding to the set region among sensor data included in the sensor data set.

Referring to FIG. 10, the vehicle 1010 may detect various objects around the vehicle 1010 using its sensor. The vehicle 1010 may detect, for example, a first target vehicle 1020, a second target vehicle 1030, and a pedestrian 1040. When the same gate is set for the first target vehicle 1020 and the pedestrian 1040, data about the first target vehicle 1020 and data about the pedestrian 104 may be associated and the data about the first target vehicle 1020 and the data about the pedestrian 104 may be fused. The vehicle 1010 may obtain information about a type (e.g., the first target vehicle 1020, the second target vehicle 1030, the pedestrian 1040, a bicycle (not shown), a motorcycle (not shown), or the like) of an object around the vehicle 1010 using its sensor. The vehicle 1010 may set a form of a gate to be suitable for the type of the object around the vehicle 1010. The vehicle 1010 may set an oval gate for each of the first target vehicle 1020 and the second target vehicle 1030 and may set a circular gate, which is smaller than the gate for each of the first target vehicle 1020 and the second target vehicle 1030, for the pedestrian 1040.

Figure 11:
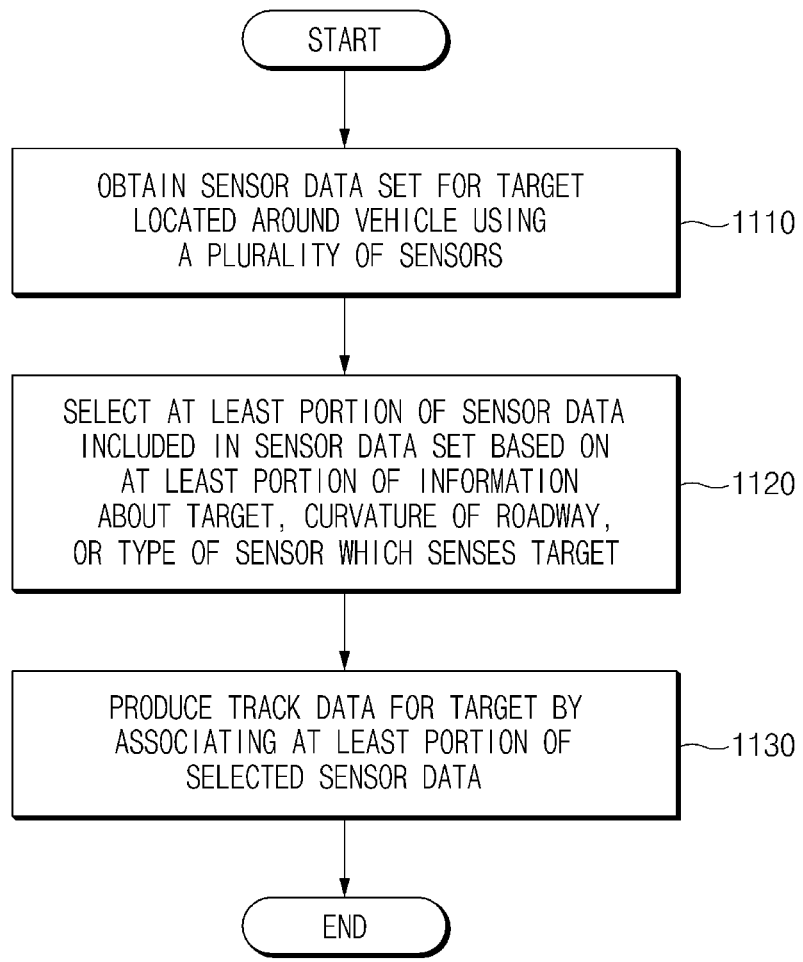
FIG. 11 is a flowchart illustrating a method for associating sensor data.

FIG. 11 is a flowchart illustrating a method for associating sensor data in some forms of the present disclosure.

Hereinafter, it may be assumed that an apparatus 100 of FIG. 1 performs a process of FIG. 11. Further, in a description of FIG. 11, an operation described as being performed by an apparatus may be understood as being controlled by a processor 120 of the apparatus 100.

Referring to FIG. 11, in operation 1110, the apparatus may obtain a sensor data set for a target located around a vehicle using a plurality of sensors. For example, the apparatus may obtain first sensor data for the target using a first sensor, may obtain second sensor data for the target using a second sensor, and may obtain third sensor data for the target using a third sensor.

In operation 1120, the apparatus may select at least a portion of sensor data included in the sensor data set based on at least a portion of information about the target, a curvature of a roadway, or a type of a sensor which senses the target. For example, the apparatus may set a gate based on a distance between the apparatus and the target, a magnitude of a relative speed of the target, a curvature of a roadway where the target is located, a motion direction of the target, a type of a sensor which senses the target, and/or a type of the target and may select sensor data included in the gate.

In operation 1130, the apparatus may generate track data for the target by associating at least a portion of the selected sensor data. For example, the apparatus may calculate a distance between track data predicted from track data of a previous frame and sensor data of a current frame and may generate track data of the current frame using sensor data with a near distance.

Figure 12:
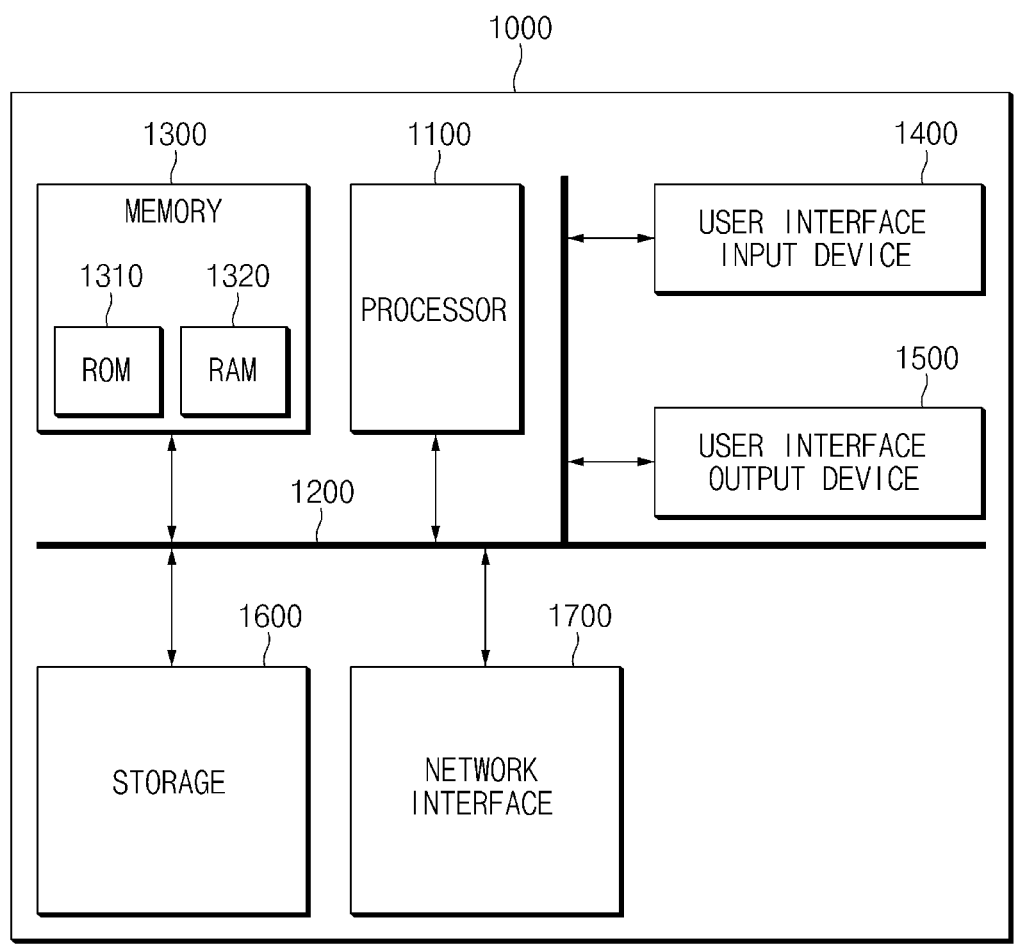
FIG. 12 is a block diagram illustrating a configuration of a computing system.

FIG. 12 is a block diagram illustrating a configuration of a computing system in some forms of the present disclosure.

Referring to FIG. 12, the above-mentioned user input processing method in some forms of the present disclosure may be implemented through the computing system. A computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for executing processing of instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with some forms of the present disclosure disclosed in the specification may be directly implemented with a hardware module, a software module, or combinations thereof, executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The apparatus and method for associating sensor data in some forms of the present disclosure may maintain association of data obtained by a plurality of sensors in a robust manner by dynamically adjusting a value associated with data association based on information about a target, a curvature of a roadway, a type of a sensor, and the like.

In addition, various effects indirectly or directly ascertained through the present disclosure may be provided.

While the present disclosure has been described with reference to exemplary forms, it will be apparent to those skilled in the art that various changes and modifications may be made without departing from the spirit and scope of the present disclosure.

Therefore, exemplary forms of the present disclosure are not limiting, but illustrative, and the spirit and scope of the present disclosure is not limited thereto. The spirit and scope and the present disclosure should be interpreted by the following claims, it should be interpreted that all technical ideas which are equivalent to the present disclosure are included in the spirit and scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for associating sensor data in a vehicle, the apparatus comprising:
   a plurality of sensors configured to sense an external object; and
   a processor electrically connected to the plurality of sensors, the processor configured to:
   obtain a sensor data set for a target located around the vehicle using the plurality of sensors, wherein the sensor data set comprises sensor data sensed by each sensor of the plurality of sensors;
   select sensor data sensed by at least part of the plurality of sensors from among the sensor data set based on first information, wherein the first information comprises at least one of target information, a curvature of a road where the vehicle or the target is traveling, or a type of a sensor sensing the target, wherein the target information further comprises a type of the target including a size of the target and a position of the target;
   set a region for determining validity of the sensor data set based on the first information, wherein a size of the region and a direction of the region are set according to the first information;
   select sensor data corresponding to the region among the sensor data set; and
   calculate track data for the target by combining the selected sensor data,
   wherein the track data is calculated using the sensor data determining coordinates which are relatively near to the coordinates of a predicted track data based on a distance between coordinates of the predicted track data and coordinates of sensor data measured at first frame, and a distance between coordinates of the predicted track data and coordinates of sensor data measured at second frame, and
   wherein, when the region for determining the validity of the sensor data set is set, the processor is further configured to:
   detect whether a target vehicle moves in a same direction with the vehicle or whether the target vehicle is spotted from a predetermined position from an intersection of roads;
   when it is detected that the target vehicle moves in the same direction with the vehicle, increase the region for the target vehicle in a horizontal direction; and
   when the target vehicle is spotted from the predetermined position from the intersection of roads, increase the region for the target vehicle in a vertical direction.

2. The apparatus of claim 1, wherein the plurality of sensors comprise a radar and a camera.

3. The apparatus of claim 1, wherein the plurality of sensors comprise a front radar, a front view camera, and a side view camera.

4. The apparatus of claim 1, wherein the target information comprises at least one of a distance between the vehicle and the target, a difference between a speed of the vehicle and a speed of the target, or a motion direction of the target.

5. The apparatus of claim 1, wherein the processor is further configured to:
   set the region for determining validity of the sensor data set based on the distance between the vehicle and the target.

6. The apparatus of claim 5, wherein the processor is configured to:
   increase the region when the distance between the vehicle and the target becomes farther than a predetermined distance; and
   decrease the region when the distance between the vehicle and the target becomes closer than the predetermined distance.

7. The apparatus of claim 1, wherein the processor is configured to:
   set the region for determining validity of the sensor data set based on a difference between the speed of the vehicle and the speed of the target.

8. The apparatus of claim 7, wherein the processor is configured to:

increase the region when the difference between the speed of the vehicle and the speed of the target becomes greater than a predetermined value; and decrease the region when the difference between the speed of the vehicle and the speed of the target becomes less than the predetermined value.

9. The apparatus of claim 1, wherein the processor is configured to:

set the region for determining validity of the sensor data set based on a curvature of the road.

10. The apparatus of claim 9, wherein the processor is configured to:

increase the region when the curvature of the road becomes greater than a predetermined range; and decrease the region when the curvature of the roadway becomes less than the predetermined range.

11. The apparatus of claim 1, wherein the processor is configured to:

set the region for determining validity of the sensor data set based on a motion direction of the target.

12. The apparatus of claim 11, wherein the processor is configured to:

increase a length of the region in the motion direction of the target.

13. The apparatus of claim 1, wherein the processor is configured to:

set the region for determining validity of the sensor data set based on the type of the sensor.

14. A method for associating sensor data in a vehicle, the method comprising:

obtaining a sensor data set for a target located around the vehicle using a plurality of sensors of the vehicle, wherein the sensor data set comprises sensor data sensed by each sensor of the plurality of sensors;

selecting sensor data sensed by at least part of the plurality of sensors from among the sensor data set based on first information, wherein the first information comprises at least one of target information, a curvature of a road where the vehicle or the target is traveling, or a type of a sensor sensing the target, wherein the target information further comprises a type of the target including a size of the target and a position of the target;

setting a region for determining validity of the sensor data set based on the first information, wherein a size of the region and a direction of the region are set according to the first information;

selecting sensor data corresponding to the region among the sensor data set; and calculating track data for the target by combining the selected sensor data, wherein the track data is generated using the sensor data having coordinates which are relatively near to the coordinates of a predicted track data based on a distance between coordinates of the predicted track data and coordinates of sensor data measured at first frame, and a distance between coordinates of the predicted track data and coordinates of sensor data measured at second frame, and wherein setting the region for determining the validity of the sensor data set further comprises:

detecting whether a target vehicle moves in a same direction with the vehicle or whether the target vehicle is spotted from a predetermined position from an intersection of roads;

when it is detected that the target vehicle moves in the same direction with the vehicle, increasing the region for the target vehicle in a horizontal direction; and when the target vehicle is spotted from the predetermined position from the intersection of roads, increasing the region for the target vehicle in a vertical direction.

15. The method of claim 14, wherein the target information comprises at least one of a distance between the vehicle and the target, a difference between a speed of the vehicle and a speed of the target, or a motion direction of the target.

* * * * *